United States Patent
Kim et al.

(10) Patent No.: US 10,689,510 B2
(45) Date of Patent: Jun. 23, 2020

(54) NANOPARTICLE-POLYMER FLUORESCENT COMPOSITE AND METHOD OF PREPARING THE SAME

(71) Applicant: KOREA UNIVERSITY RESEARCH AND BUSINESS FOUNDATION, Seoul (KR)

(72) Inventors: Young Keun Kim, Seoul (KR); Yu Jin Kim, Seongnam-si (KR); Bum Chul Park, Daejeon (KR)

(73) Assignee: Korea University Research and Business Foundation, Seoul (KR)

( * ) Notice: Subject to any disclaimer, the term of this patent is extended or adjusted under 35 U.S.C. 154(b) by 39 days.

(21) Appl. No.: 16/099,352

(22) PCT Filed: May 25, 2017

(86) PCT No.: PCT/KR2017/005466
§ 371 (c)(1),
(2) Date: Nov. 6, 2018

(87) PCT Pub. No.: WO2017/222200
PCT Pub. Date: Dec. 28, 2017

(65) Prior Publication Data
US 2019/0211196 A1 Jul. 11, 2019

(30) Foreign Application Priority Data
Jun. 20, 2016 (KR) .................. 10-2016-0076749

(51) Int. Cl.
*C08L 33/12* (2006.01)
*C08K 3/22* (2006.01)
*C08L 27/06* (2006.01)
*C09K 11/06* (2006.01)
*C08J 3/28* (2006.01)
*C08L 39/06* (2006.01)
*B82Y 20/00* (2011.01)
*B82Y 40/00* (2011.01)

(52) U.S. Cl.
CPC .............. *C08L 33/12* (2013.01); *C08J 3/28* (2013.01); *C08K 3/22* (2013.01); *C08L 27/06* (2013.01); *C08L 39/06* (2013.01); *C09K 11/06* (2013.01); *B82Y 20/00* (2013.01); *B82Y 40/00* (2013.01); *C08K 2003/2268* (2013.01); *C08K 2003/2275* (2013.01); *C08K 2201/003* (2013.01); *C08K 2201/005* (2013.01); *C08K 2201/011* (2013.01)

(58) Field of Classification Search
CPC .......... C08L 33/12; C08L 39/06; C08L 27/06; C08K 3/22; C09K 11/06; C08J 3/28
USPC ....................................................... 524/430
See application file for complete search history.

(56) References Cited

FOREIGN PATENT DOCUMENTS

KR  10-2009-0081758 A  7/2009

OTHER PUBLICATIONS

Dallas et al (Synthesis, characterization and thermal properties of polymer/magnetite nanocomposites, Nanotechnology 17 (2006) 2046-2053) (Year: 2006).*
Holland, B.J., et al., "The kinetics and mechanisms of the thermal degradation of poly(methyl methacrylate) studied by thermal analysis-Fourier transform infrared spectroscopy", *Polymer*, 2001, pp. 4825-4835, vol. 42 (11 pages in English).
Laurent, Sophie, et al., "Magnetic Iron Oxide Nanoparticles: Synthesis, Stabilization, Vectorization, Physicochemical Characterizations, and Biological Applications", *Chem. Rev.*, 2008, pp. 2064-2110, vol. 108 (47 pages in English).
Swiatkowska-Warkocka, Zaneta, et al., "Controlling exchange bias in Fe3O4/FeO composite particles prepared by pulsed laser irradiation", *Nanoscale Research Letters*, 2011, pp. 1-7, vol. 6 (7 pages in English).
Sadat, M.E., et al., "Photoluminescence and photothermal effect of Fe3O4 nanoparticles for medical imaging and therapy", *Applied Physics Letters*, 2014, pp. 1-6, vol. 105 (6 pages in English).
International Search Report dated Aug. 25, 2017 in corresponding International Application No. PCT/KR2017/005466 (3 pages in English, 3 pages in Korean).

* cited by examiner

*Primary Examiner* — Doris L Lee
(74) *Attorney, Agent, or Firm* — NSIP Law

(57) ABSTRACT

Provided are a nanoparticle-polymer fluorescent composite and a method of preparing the same. The method includes preparing magnetite ($Fe_3O_4$) nanoparticles, mixing the magnetite ($Fe_3O_4$) nanoparticles, an organic polymer having an aliphatic carbon chain, and a solvent for dissolving the organic polymer to prepare a preliminary composite and drying the preliminary composite to form a nanoparticle polymer composite, and irradiating a pulse laser to the nanoparticle polymer composite to change the magnetite ($Fe_3O_4$) nanoparticles to Wustite nanoparticles and providing conjugated polymer characteristics to the organic polymer.

8 Claims, 12 Drawing Sheets

29.8 ± 2.76nm (9.7%)

101.7 ± 9.89nm (9.7%)

56.7 ± 5.14nm (9.1%)

121.2 ± 10.8nm (8.9%)

87.2 ± 8.90nm (10.2%)

193.2 ± 17.4nm (9.0%)

NANOPARTICLE-POLYMER FLUORESCENT COMPOSITE AND METHOD OF PREPARING THE SAME

CROSS REFERENCE TO RELATED APPLICATION(S)

This application is a U.S. national stage application of International Application No. PCT/KR2017/005466 filed on May 25, 2017, which claims the benefit of Korean Patent Application No. 10-2016-0076749 filed on Jun. 20, 2016, in the Korean Intellectual Property Office, the entire disclosures of which are incorporated herein by reference for all purposes.

TECHNICAL FIELD

The present disclosure relates to a composite and a method of preparing the same which constitutes a composite of a specific polymer and magnetite ($Fe_3O_4$) nanoparticles, induces photothermal effect of nanoparticles with a high-energy high-power pulse laser, and converts a specific polymer around the magnetite nanoparticles into a backbone chain having conjugated polymer characteristics to have fluorescence characteristics.

BACKGROUND

Nanomaterials are synthesized in a nanometer ($10^9$ m) scale to have new characteristics and exhibit unique properties for each material. Nanomaterials have been applied to materials industry, energy environment industry, electronics industry, machinery industry, and medical industry. Accordingly, it is expected to create convergence industries converging with existing industries and new nanotechnology markets. With the rapid development of nanotechnology and possibility to chemically synthesize magnetic nanoparticles, magnetic nanoparticles have merged with various fusion fields and have been used in magnetic memories, magnetic sensors, live cell separation, and the like. As magnetic, optical, and electrical characteristics may be adjusted by controlling size, crystallinity, arrangement, and the like of nanoparticles, adjustment of various characteristics is being studied according to application fields.

In particular, iron oxide nanoparticles have various phases such as Wustite ($Fe_{1-x}O$), Hematite ($\alpha$-$Fe_2O_3$), Maghemite ($\gamma$-$Fe_2O_3$), and magnetite ($Fe_3O_4$). Iron oxide nanoparticles have applicability in various fields such as a magnetic resonance imaging contrast agent, a magnetic memory device, collection of contaminants, magnetic separation and cell arrangement, drug delivery, and the like due to unique characteristics thereof. To apply materials to various fields, it is essential to understand magnetic, electrical, and optical characteristics of the materials. Studies have been actively conducted on characteristic evaluation analysis of each type of iron oxide phases.

A magnetite-PMMA (poly(methyl methacrylate)) composite has been mainly used in thermo-sensitive drug delivery and cell separation systems. PMMA is a well-known polymer which may perform structural modification using thermal stimulus and electron irradiation. However, there is substantially no study which is conducted on properties of the magnetite-PMMA composite using light irradiation.

Moreover, it is not easy to predict a change in characteristics of the magnetic nanoparticles themselves and a changes in surrounding environment caused by a catalytic reaction to photo-thermal and photo-chemical reactions arising from a photoreaction. Accordingly, there is difficulty in synthesizing a composite fused with nano-sized iron oxide nanoparticles and preparing a new material induced by photoreaction.

According to an example embodiment, photothermal effect of iron oxide nanoparticles is induced by irradiating a high-power high-energy laser to Maghemite or magnetite-based iron oxide nanoparticles chemically synthesized in a reducing atmosphere of iron oxide using a specific polymer and a specific solvent, and deformation of a conjugated polymer type backbone chain of a neighboring polymer of the iron oxide nanoparticles is induced by generated heat. As a result, a white fluorescence nanoparticle polymer fluorescent composite is prepared.

SUMMARY

Example embodiments of the present disclosure provide a nanoparticle-polymeric fluorescent composite which provide photothermal effect caused by a pulse laser to a composite of iron oxide nanoparticles and a polymer to provide a backbone chain change of polymer.

A method of preparing a nanoparticle-polymer fluorescent composite according to an example embodiment of the present disclosure includes preparing magnetite ($Fe_3O_4$) nanoparticles, mixing the magnetite ($Fe_3O_4$) nanoparticles, an organic polymer having an aliphatic carbon chain, and a solvent for dissolving the organic polymer to prepare a preliminary composite and drying the preliminary composite to form a nanoparticle polymer composite, and irradiating a pulse laser to the nanoparticle polymer composite to change the magnetite ($Fe_3O_4$) nanoparticles to Wustite nanoparticles and providing conjugated polymer characteristics to the organic polymer.

In an example embodiment, the organic polymer may include at least one of poly(methyl methacrylate) (PMMA), polyvinylpyrrolidone (PVP), and polyvinyl chloride (PVC).

In an example embodiment, the pulse laser may be a pulse laser having a wavelength of 690 nanometers to 1040 nanometers.

In an example embodiment, the magnetite ($Fe_3O_4$) nanoparticles may be prepared by a polyol method, and the magnetite ($Fe_3O_4$) nanoparticles may each have a diameter of 30 nanometers to 200 nanometers.

In an example embodiment, the irradiating a pulse laser may be performed using a multiphoton confocal microscope.

In an example embodiment, in the composite, PMMA to nanoparticles may be 1:0.0002 to 1:0.02 based on weight.

A nanoparticle-polymer fluorescent composite according to an example embodiment of the present disclosure includes an organic polymer including Wustite nanoparticles and an aliphatic carbon chain. The Wustite nanoparticles is phase-changed using a photothermal reaction from the magnetite nanoparticles by a pulse laser, and the organic polymer has a backbone chain of conjugated polymer characteristics by the pulse laser.

In an example embodiment, the magnetite ($Fe_3O_4$) nanoparticles may each have a diameter of 30 nanometers to 200 nanometers, and the organic polymer may include at least one of poly(methyl methacrylate) (PMMA), polyvinylpyrrolidone (PVP), and polyvinyl chloride (PVC).

BRIEF DESCRIPTION OF THE DRAWINGS

The present disclosure will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the present disclosure.

DETAILED DESCRIPTION

Figure 1:
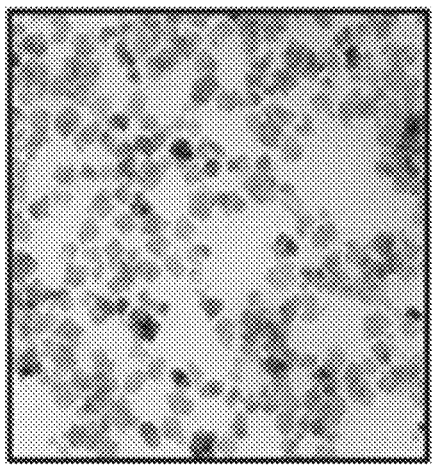
FIG. 1 is a transmission electron microscope (TEM) image of nanoparticles of a magnetite prepared by a polyol method for the present disclosure.
Figure 1:
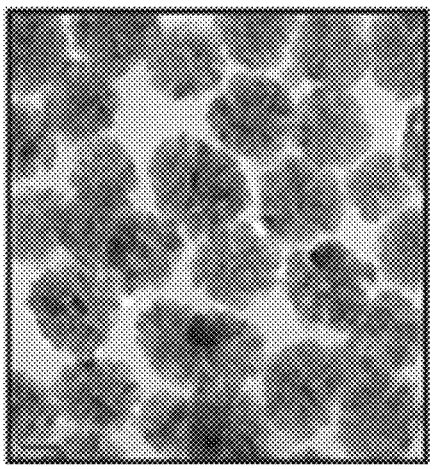
Figure 1:
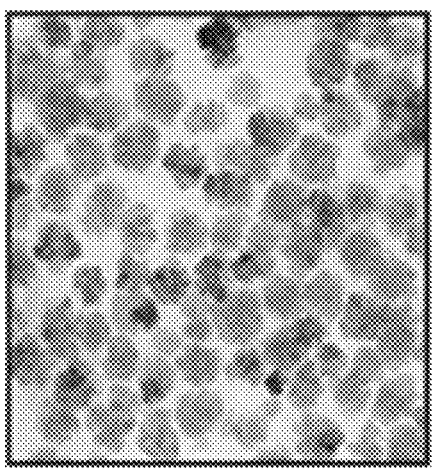
Figure 1:
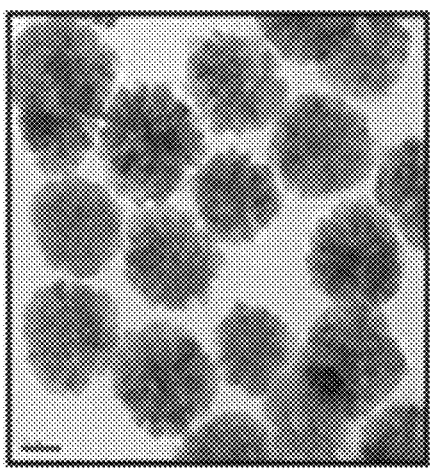
Figure 1:
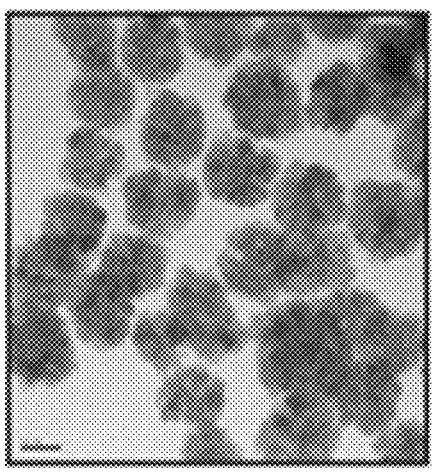
Figure 1:
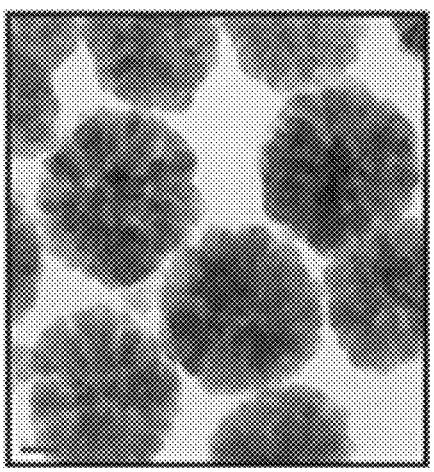

Magnetite nanoparticles bound to a polymer may be converted into Wustite nanoparticles by irradiation of a multiphoton pulse laser, and the polymer may be converted into a polymer having a backbone chain of conjugated polymer characteristics by the multiphoton pulse laser. Accordingly, a composite of Wustite nanoparticles and a polymer having a backbone chain of conjugated polymer properties provides fluorescence properties.

A light emitter of an electroluminescent device is used as a light source of a lighting device or as a backlight of a display device. The light emitter of the electroluminescent device is required to have a planar shape and emit a light of white color or a color close to white.

Currently, most white organic electroluminescent devices have a structure in which a light emitting layer configured to generate a light emitting color that is a complementary color is laminated. A laminated structure is mainly fabricated using a combination of yellow and blue or a combination of green, blue, and red.

Although a backlight unit of a display device uses a light emitting diode (LED) as a light source, the LED suffers from a disadvantage that a dot is visible during surface lighting because a point light source is strong. Thus, a surface light source is generated by uniformly distributing and spreading a light from a light source using a light guide panel and a diffusion sheet.

However, a currently known white light emitting device has less efficiency for use in lighting application. Particularly, when a surface light source for lighting is fabricated using a light guide film and a diffusion film, scattering of first order light may be used to reduce light emission intensity. Moreover, when a distance from the diffusion plate configured to diffuse a light is short, a portion that does not receive light appears dark.

Accordingly, light transmission efficiency of an optical sheet for a surface light source needs to be improved to use a white light emitting device as a backlight of a lighting or display device. Conventional surface light source lighting has difficulty in providing luminescent characteristics only in a desired region.

In the case of a surface light source using a diffusion plate, a portion that does not receive a light may appear dark when a distance from a point light source to the diffuser plate is short. Accordingly, a sufficient distance from the light source to the diffusion plate should be secured or an additional point light source should be secured to illuminate an entire region of the diffusion plate.

According to an example embodiment, a magnetite nanoparticle composite may induce fluorescence from the composite using an excitation light source to use only a desired region as a surface light source.

According to an example embodiment, a magnetite nanoparticle composite may be applied to a film form as well as a detection contrast agent.

According to an example embodiment, a magnetite nanoparticle composite may have a broad wavelength spectrum and may provide excellent color stability.

According to an example embodiment, a magnetite nanoparticle composite film may implement a white light source and may locally adjust fluorescence characteristics to adjust illuminance and lighting shape. Thus, the magnetite nanoparticle composite film may be used in special lighting purposes that require various directions.

A magnetite nanoparticle composite bound to a polymer is changed by multiphoton pulse laser irradiation, and the changed composite may receive excited light in a visible light band or less to generate white fluorescence. Specifically, a composite of magnetite nanoparticles and PMMA may exhibit fluorescence characteristics resulting from carbon double bond caused by oxidation of the PMMA.

We propose a new fluorescent material generated by photothermal effect resulting from an interaction between a magnetic nano-clusters (NC)-polymer composite and multiphoton pulse laser irradiation. We propose generation of strong fluorescence caused by photothermal effect induced thermal degradation and oxidation of PMMA chains.

Example embodiments of the present disclosure will now be described below more fully with reference to accompanying drawings. The present disclosure may, however, be embodied in different forms and should not be constructed as limited to the embodiments set forth herein. Rather, these embodiments are provided so that this disclosure will be thorough and complete, and will fully convey the scope of the present invention to those skilled in the art.

Reference numerals are indicated in detail in example embodiments of the present disclosure, and their examples are represented in reference drawings. In every possible case, like reference numerals are used for referring to the same or similar elements in the description and drawings.

[Synthesis of Magnetic Nanoparticle]

According to an example embodiment, synthesis of magnetite ($Fe_3O_4$) nanoparticles was performed by a polyol method. In a reaction, iron chloride hexahydrate ($FeCl_3 6H_2O$) was used as a precursor. Ethylene glycol was a reducing agent and was used as a solvent. Sodium acetate and distilled water ($H_2O$) were used as assistant agents aiding hydrolysis, respectively. After mixing the above chemical materials, a reactive solution is heated to a high temperature (200 degrees Celsius) while maintaining stirring. The reactive solution is cooled to a room temperature.

Ethanol is added to the cooled reactive solution. The ethanol-added reactive solution is cleaned using a centrifuge. Then, precipitated magnetite ($Fe_3O_4$) nanoparticles are separated and the separated magnetite ($Fe_3O_4$) nanoparticles are mixed again with ethanol and cleaned using the centrifuge.

According to a modified embodiment, the magnetite ($Fe_3O_4$) nanoparticles may be prepared by another method rather than the polyol method and may have another structure rather than a multi-granule structure.

FIG. 1 is a transmission electron microscope (TEM) image of nanoparticles of a magnetite prepared by a polyol method for the present disclosure.

Referring to FIG. 1, magnetite ($Fe_3O_4$) nanoparticles may be formed by agglomeration of small grains. An average diameter of the magnetite ($Fe_3O_4$) nanoparticles may be 10 nanometers (nm) or more. The average diameter of the nanoparticles may be adjusted depending on a reaction condition such as a concentration of iron chloride hexahydrate or a reaction temperature. Thus, nanocluster particles of 29.8 nm, 56.7 nm, 87.2 nm, 101.7 nm, 121.2 nm, and 193.2 nm may be prepared, respectively.

[Preliminary Composite of PMMA and Magnetite Nanoparticles]

Figure 2:
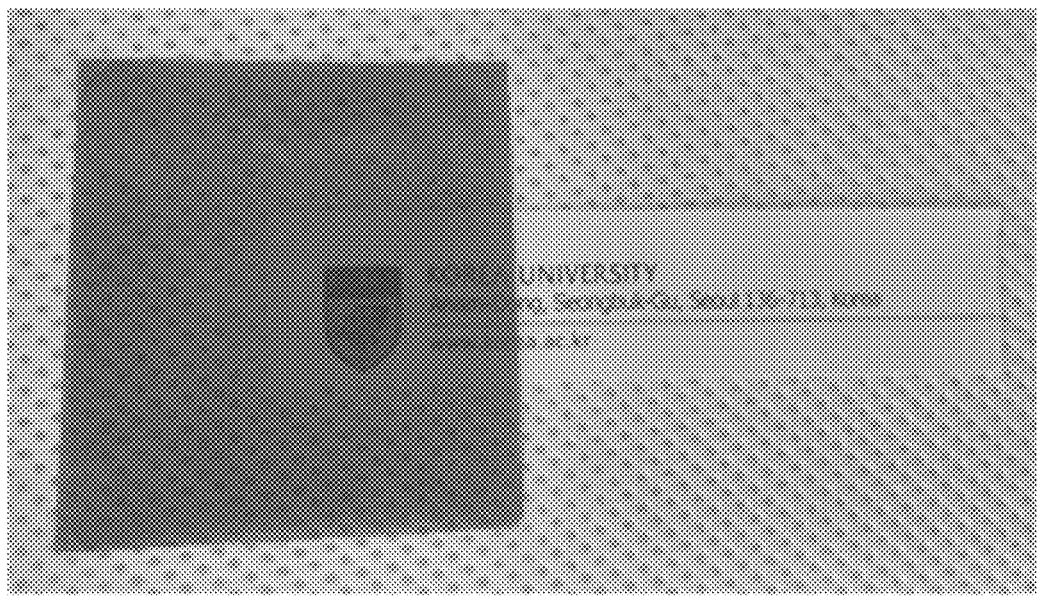
FIG. 2 is an image of a film-type composite of magnetite nanoparticles and a PMMA polymer according to an example embodiment of the present disclosure.

FIG. 2 is an image of a film-type composite of magnetite nanoparticles and a PMMA polymer according to an example embodiment of the present disclosure.

Referring to FIG. 2, a preliminary composite including a magnetite nanoparticle, a PMMA polymer establishing a reducing atmosphere of the magnetite nanoparticle, and a solvent for dissolving the PMMA polymer is prepared. Chlorobenzene is used as the solvent.

The preliminary composite was prepared by mixing 0.1 mg of nanoparticles having a size of about 100 nm with 1 ml of a PMMA-dissolved chlorobenzene solution. When the preliminary composite is dried to remove the solvent in the atmosphere at a temperature ranging from a room temperature to 80 degrees Celsius, a composite is prepared. A PMMA-chlorobenzene solution contain a PMMA polymer of 4 percent by weight (wt %) of the total mass.

The preliminary composite is coated on a substrate and dried. The dried composite may be prepared into a thin film or a film having a constant thickness by providing energy such as ultrasonic vibration.

According to a modified embodiment, the preliminary composite is preferably prepared by mixing 1 milligram (mg) to 0.01 mg of magnetite nanoparticles with 1 milliliter (ml) of a PMMA-chlorobenzene solution. The magnetite nanoparticles may have a size ranging from 30 nm to 200 nm.

In the composite, PMMA to nanoparticles may be 1:0.0002 to 1:0.02 based on weight.

According to a modified embodiment, the PMMA polymer may be changed to a polymer having an aliphatic carbon chain such as polyvinylpyrrolidone (PVP), polyvinyl chloride (PVC) or the like. PMMA has a backbone chain and a side chain. The backbone chain is an aliphatic carbon chain.

[Induction of Photothermal Effect of Iron Oxide Nanoparticles by Multiphoton Laser and Structural Chain Change of Conjugated Polymer Type of Polymer by Generated Heat]

Figure 3:
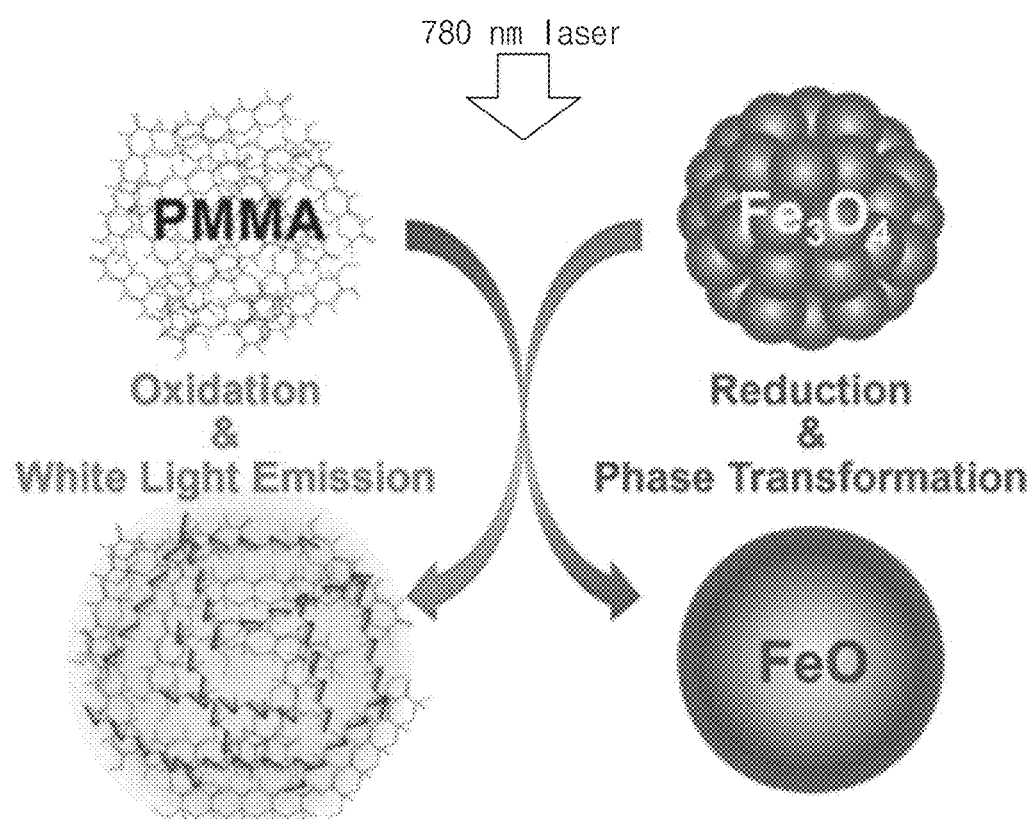
FIG. 3 is a conceptual diagram illustrating photonic reactions of a composite containing magnetite nanoparticles and a PMMA polymer.

FIG. 3 is a conceptual diagram illustrating photonic reactions of a composite containing magnetite nanoparticles and a PMMA polymer.

Referring to FIG. 3, multiphoton laser irradiation may result in side chain degradation of the PMMA to provide $\pi$-conjugated polymer like transformation. The $\pi$-conjugated polymer like transformation may provide excitation light absorption and fluorescence emission characteristics in a visible light region.

The photonic reaction may include oxidation of the PMMA polymer and reduction of the magnetite nanoparticles. The photothermal effect induced by 780 nm multiple quantum pulse laser irradiation may provide heat generation to the nanoparticles, excite the oxidation of the PMMA polymer, and cause thermal degradation of the PMMA polymer around the magnetite nanoparticles. The magnetite nanoparticles may be reduced by the photothermal effect to perform phase transformation into a nanostructure having a Wustite structure. Nanoparticles of the Wustite structure may be recrystallized. Thus, the composite prepared by a photothermal reaction emits fluorescence in a wavelength band different from the external excitation light due to external excitation light.

That is, the magnetite nanoparticles are recrystallized by multiphoton pulse laser irradiation and perform phase transformation. The magnetite nanoparticles are changed to Wustite nanoparticles. The magnetite nanoparticles may be changed from a multi-granule structure to a single-crystal Wustite structure. In addition, the PMMA around the nanoparticles may be oxidized by side chains separation of the PMMA caused by multiphoton pulse laser irradiation. The multiphoton pulse laser irradiation may induce oxidation of the PMMA polymer and reduction of the magnetite nanoparticles due to the photothermal effect.

According to an example embodiment, the multiphoton pulse laser irradiation was performed using a multiphoton confocal microscope. Conventionally, the multiphoton confocal microscope provides multiphoton imaging. The multiphoton confocal laser microscope may irradiate a laser light source, which is a point light source, on a target surface and may focus transmitted or reflected light to obtain target information from the light. The multiphoton confocal microscope may reduce the scattering using a pulse near infrared laser to image only a focal plane without pinholes. The pulse laser may have a wavelength of 690 nm to 1040 nm.

According to an example embodiment, the multiphoton confocal microscope is used to focus laser beam on a composite to provide the photothermal effect to the composite film rather than used to image a sample (the composite film).

The multiphoton confocal microscope includes a pulse near infrared laser. The pulse near infrared laser has a wavelength of 780 nm, a pulse width of 100 femtoseconds (fsec), a repetition rate of 80 megahertz (MHz), a beam diameter (1/e2) of 1.2 mm, and maximum time average power of 3 watts (W). Power irradiated to the composite (irradiation power) may be 30 megawatts (mW) to 300 mW. The pulse near infrared laser beam may be focused on a sample or composite film through an objective lens system. The multiphoton confocal microscope may move a sample stage to provide laser beam for each position.

In the case in which the multiphoton confocal microscope performs scanning while operating at pulse near infrared laser of 150 mW, dwell time in a single pixel may be about 3.15 microseconds (μsec). The multiphoton confocal microscope may scan a 1024 by 1024 pixel using a moving stage. The single pixel may have a size of several hundreds of nanometers (nm).

The photothermal effect induced by a multiphoton laser having a wavelength of 780 nm causes heat generation. The heat generation results in thermal degradation of the PMMA polymer around the magnetite nanoparticles. Moreover, the heat generation changes the magnetite nanoparticles into Wustite nanoparticles. A backbone chain of PMMA may be separated from a side chain by pyrolysis and may perform π-conjugated polymer like transformation having a carbon double bond. The π-conjugated polymer like transformation may cause fluorescence with respect to external excitation light.

The multiphoton confocal microscope may be reused to confirm fluorescence characteristics of the external excitation light. The multiphoton confocal microscope may further include a first auxiliary laser having a wavelength of 488 nm and a second auxiliary laser having a wavelength of 543 nm.

Figure 4:
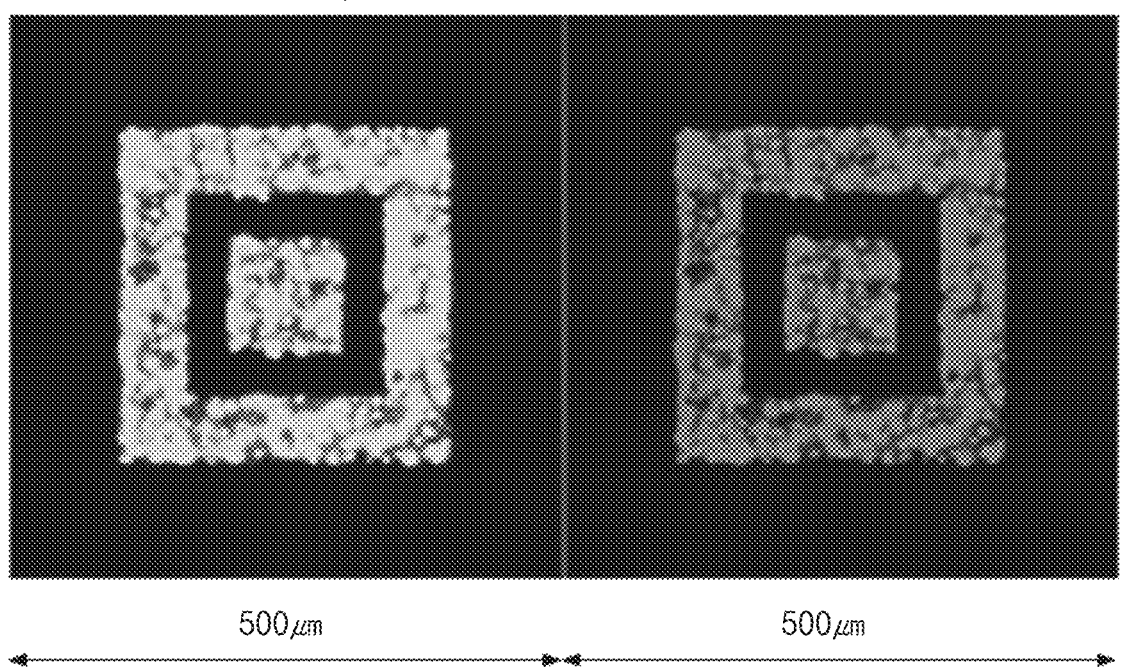
FIG. 4 is images illustrating fluorescence characteristics of a composite film of Wustite nanoparticles and a PMMA polymer according to an example embodiment of the present disclosure.

FIG. 4 is images illustrating fluorescence characteristics of a composite film of Wustite nanoparticles and a PMMA polymer according to an example embodiment of the present disclosure.

Referring to FIG. 4, irradiation of 780 nm multiphoton pulse laser induced phase transformation of a polymer composite film. In FIG. 4(a), fluorescence was measured after a first auxiliary laser having a wavelength of 488 nm was irradiated to the composite film as excitation light.

The first auxiliary laser having a wavelength of 488 nm was mounted on a confocal optical microscope. The fluorescence generated in the composite film was measured for each pixel while excitation light having a wavelength of 488 nm was irradiated to the composite film. An entire pixel has a size of 1024×1024. A square region disposed in a central portion and a square band shape surrounding the square region were regions changed by the 780 nm multiphoton pulse laser. The changed regions emitted green fluorescence, while unchanged regions did not emit the fluorescence. That is, it could be seen that a PMMA polymer was deformed by the photothermal effect of iron oxide nanoparticles. In the experimental conditions, the multiphoton laser has a wavelength of 780 nm and provides an output of 150 mW. Dwell time for a single pixel is 3.15 microseconds.

A second auxiliary laser having a wavelength of 543 nm was mounted on a confocal optical microscope. In FIG. 4(b), fluorescence was measured for each pixel while excitation light having a wavelength of 543 nm was irradiated to the composite film. An entire pixel has a size of 1024×1024. A square region in a central portion and a square band shape surrounding the square region were regions changed by the 780 nm multiphoton pulse laser. The changed regions emitted red fluorescence, while phase-unchanged regions did not emit fluorescence. That is, it could be seen a PMMA polymer was deformed by the photothermal effect of iron oxide nanoparticles. The multiphoton laser used had a wavelength of 780 nm and used an output of 150 mW. Dwell time for a single pixel is 3.15 microseconds.

Figure 5:
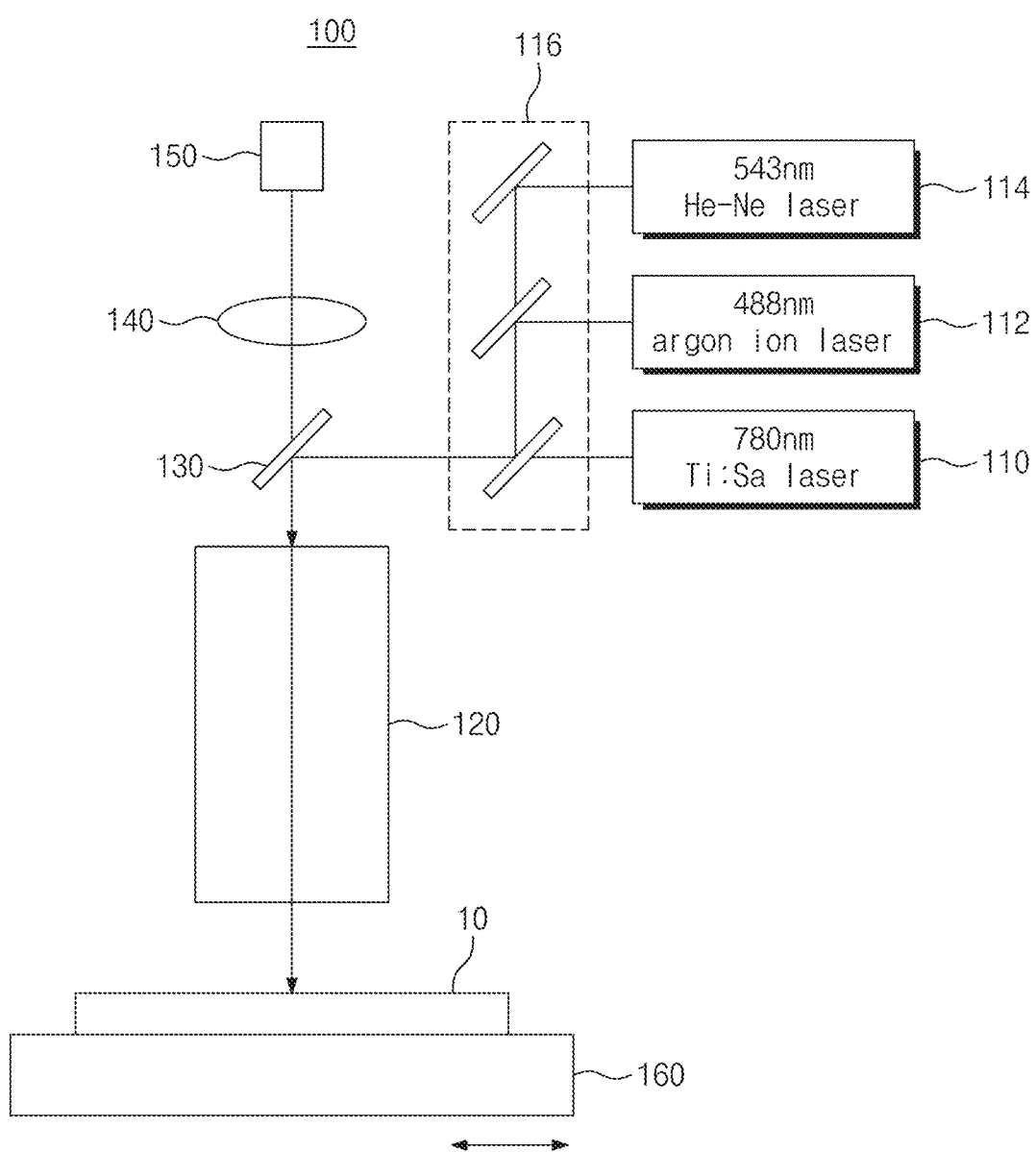
FIG. 5 is a conceptual diagram of a multiphoton confocal microscope for measuring phase change and fluorescence according to an example embodiment of the present disclosure.

FIG. 5 is a conceptual diagram of a multiphoton confocal microscope for measuring phase change and fluorescence according to an example embodiment of the present disclosure.

FIG. 5 is a conceptual diagram of a multiphoton confocal microscope for measuring phase change and fluorescence according to an example embodiment of the present disclosure.

Referring to FIG. 5, a multiphoton confocal microscope 100 may include a multiphoton pulse laser 110 as a light source, a first auxiliary laser 112, and a second auxiliary laser 114. The multiphoton confocal microscope 100 may include an objective lens 120, a moving stage 160, a beam splitter 130, a focusing lens 140, and a photodetector 150.

A beam combiner 116 may select one of the multiphoton pulse laser 110, the first auxiliary laser 112, and the second auxiliary laser 114. Accordingly, when phase change is induced, pulse laser beam of the multiphoton pulse laser 110 may be irradiated to a composite film 10 via the beam splitter 130 and the objective lens 120.

To investigate fluorescence characteristics of a phase-changed composite film, laser beam of the first auxiliary laser 112 or laser beam of the second auxiliary laser 114 is irradiated to the composite film 10 via the beam splitter 130 and the objective lens 120, and fluorescence generated in the composite film 10 may be collected in the photodetector 150 through the objective lens 120, the beam splitter 130, and the focusing lens 140.

The moving stage 160 may move the composite film 10 to at least two axes to change an irradiation position of the composite film 10

Figure 6:
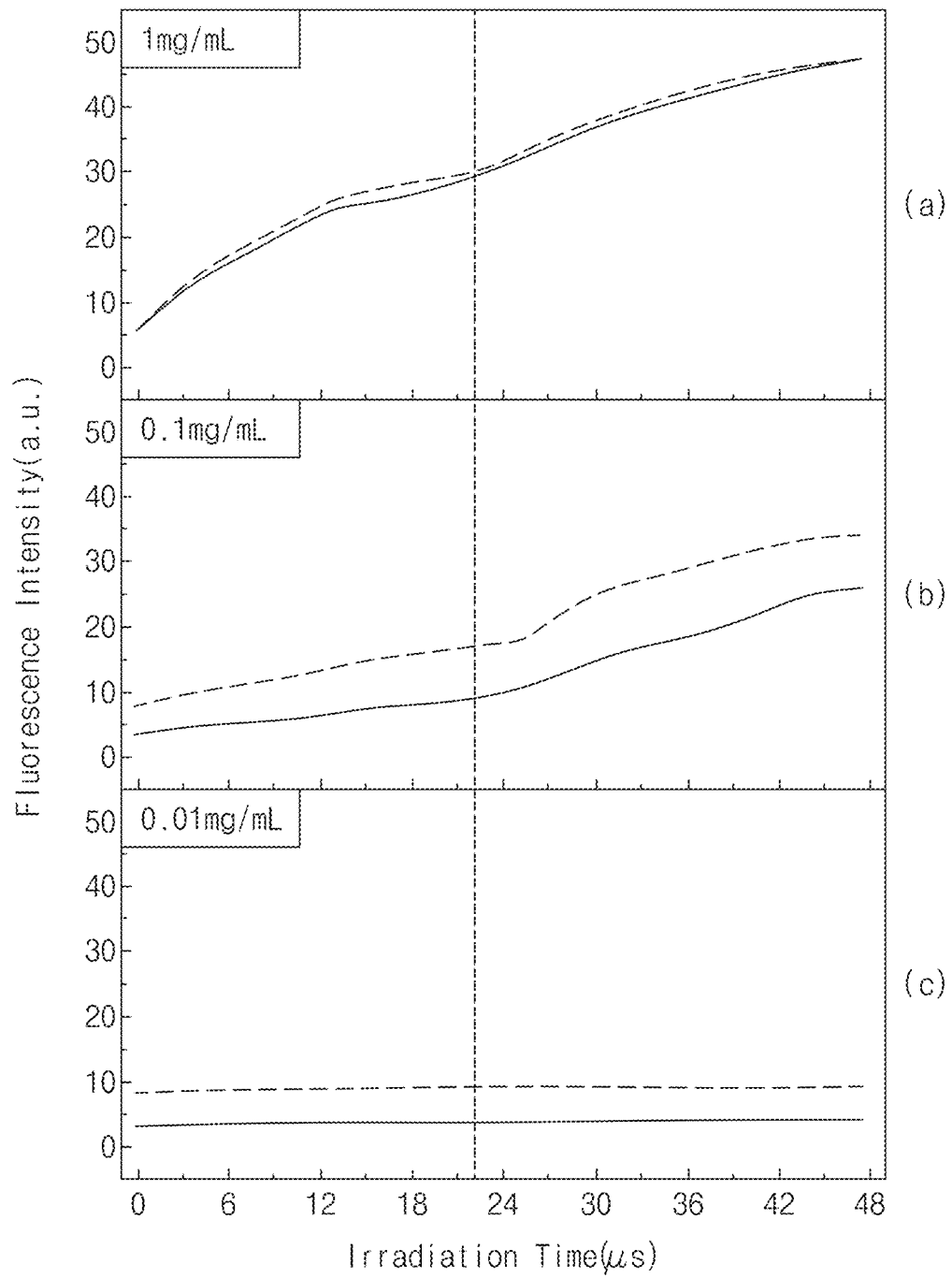
FIG. 6 shows fluorescence intensity depending on irradiation time of multiphoton laser beam of a composite according to an example embodiment of the present disclosure.

FIG. 6 shows fluorescence intensity depending on irradiation time of multiphoton laser beam of a composite according to an example embodiment of the present disclosure.

Referring to FIG. 6, a first composite (a) was prepared by mixing 0.01 mg of magnetite nanoparticles each having a size of 100 nm with 1 ml of PMMA-chlorobenzene solution, and then was dried. A second composite (b) was prepared by mixing 1 mg of PMMA-chlorobenzene solution with 0.1 mg of magnetite nanoparticles each having a size of 100 nm, and then was dried. A third composite (c) was prepared by mixing 1 mg of magnetite nanoparticles each having a size of 100 nm with 1 ml of PMMA-chlorobenzene solution, and then was dried.

The first composite (a) slightly increased in fluorescence intensity depending on irradiation time of 780 nm multiphoton laser. On the other hand, the second composite (b) and the third composite (c) increased in fluorescence intensities depending on irradiation time. Accordingly, in order for the composites (a), (b), and (c) to exhibit fluorescence characteristics, the magnetite nanoparticles needs to have a concentration of a predetermined value or more. In the dried composites, the PMMA to the magnetite nanoparticles may be 1:0.0002 to 1:0.02.

The longer the irradiation time of the 780 nm multiphoton laser, the more advantageous; and the greater power of the multiphoton laser, the more advantageous. However, when the multiphoton laser is too great, a composite may be denatured by thermal damage. On the other hand, when the multiphoton laser is too small, the composite may not exhibit fluorescence characteristics. The power of the multiphoton laser may range from 30 mW to 300 mW. The irradiation time may be 20 microseconds or more per single pixel.

Figure 7:
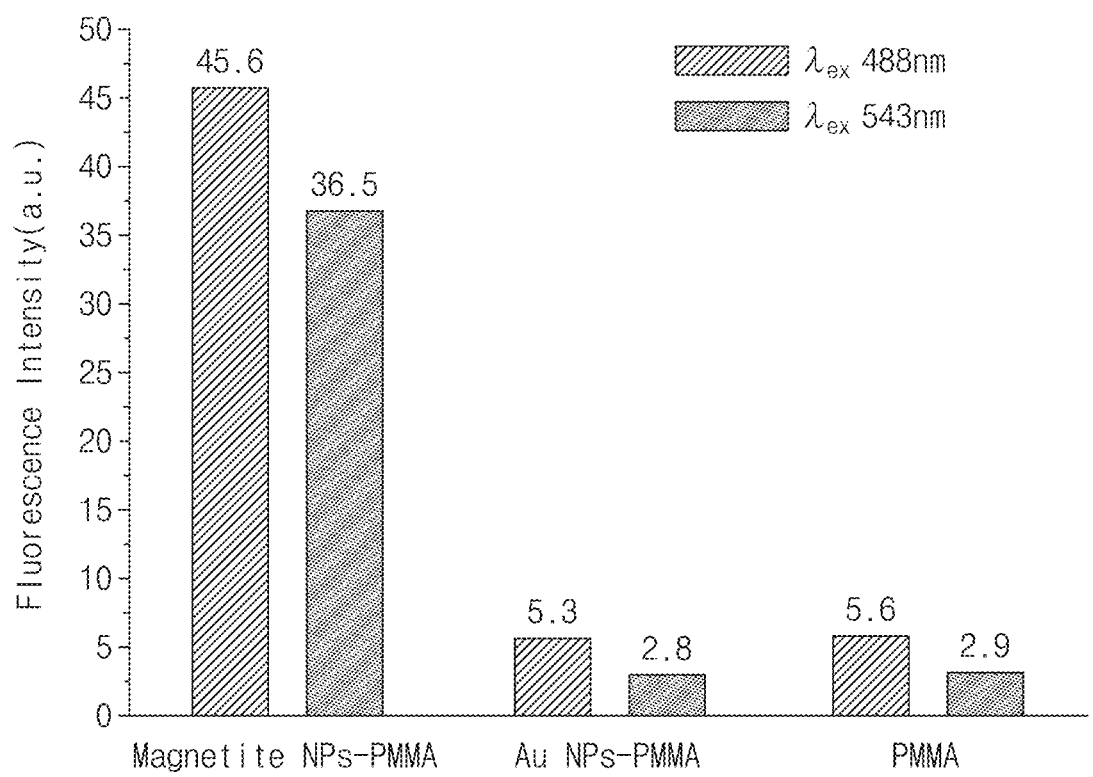
FIG. 7 is a graph illustrating fluorescence characteristics of composites according to an example embodiment of the present disclosure.

FIG. 7 is a graph illustrating fluorescence characteristics of composites according to an example embodiment of the present disclosure.

Referring to FIG. 7, we analyzed three samples. A first sample was a composite of PMMA and magnetite nanoparticles according to an example embodiment. A second sample was a complex of PMAA and silver nanoparticles. A third sample is PMMA.

The first sample (Magnetite NPs-PMMA) was prepared by mixing 1 mg of magnetite nanoparticles each having a size of 100 nm with 1 ml of PMMA-chlorobenzene solution, and then was dried. The second sample (Au NPs-PMMA) was prepared by mixing 1 mg of silver nanoparticles each having a size of 100 nm with 1 ml of PMMA-chlorobenzene solution, and then was dried. The third sample (PMMA) was dried after preparation of the PMMA-chlorobenzene solution.

The first to third samples were irradiated under the same conditions by the 78 nm multiphoton pulse laser. The first sample was changed to a composite of Wustite nanoparticles and modified PMMA by irradiation of a pulse laser. In these conditions, power of the multiphoton pulse laser was 60 mW.

The second sample exhibited weak fluorescence characteristics with respect to excitation light at 488 nm and excitation light at 543 nm. The third sample exhibited weak fluorescence characteristics with respect to excitation light at 488 nm and excitation light at 543 nm. The first sample exhibited fluorescence characteristics of 10 times or more than those of the second sample and the third sample. Fluorescence intensity was increased in excitation light at 488 nm than excitation light at 543 nm.

Heat generation resulting from the photothermal effect of magnetite nanoparticles, reduction of the iron ions in the magnetite nanoparticles, and oxidation of a PMMA polymer cause crystal structure modification of granule cluster particles. That is, the granule cluster particles change from magnetite to Wustite.

The phase change from magnetite to Wustite was confirmed by XRD analysis by irradiation of the multiphoton pulse laser.

Figure 8:
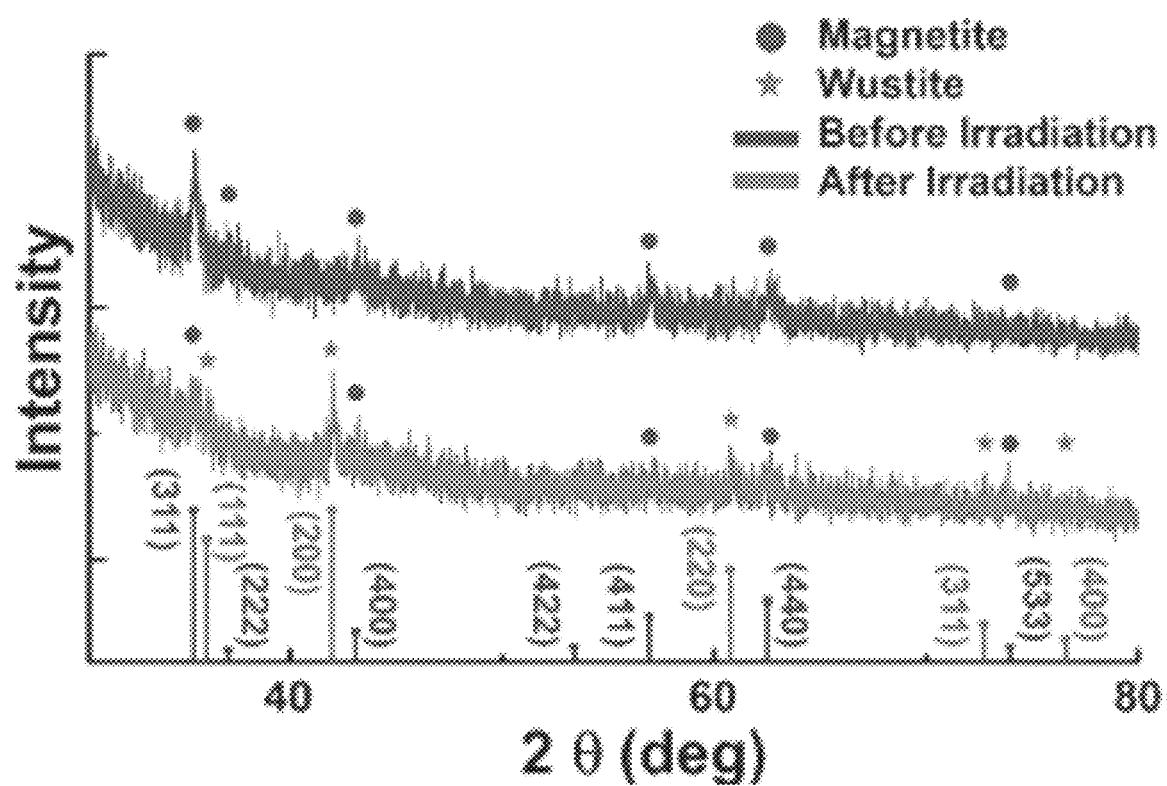
FIG. 8 shows an XRD result illustrating a phase change from magnetite to Wustite, obtained by irradiation of a multiphoton pulse laser according to an example embodiment of the present disclosure.

FIG. 8 shows an XRD result illustrating a phase change from magnetite to Wustite, obtained by irradiation of a multiphoton pulse laser according to an example embodiment of the present disclosure.

Figure 9:
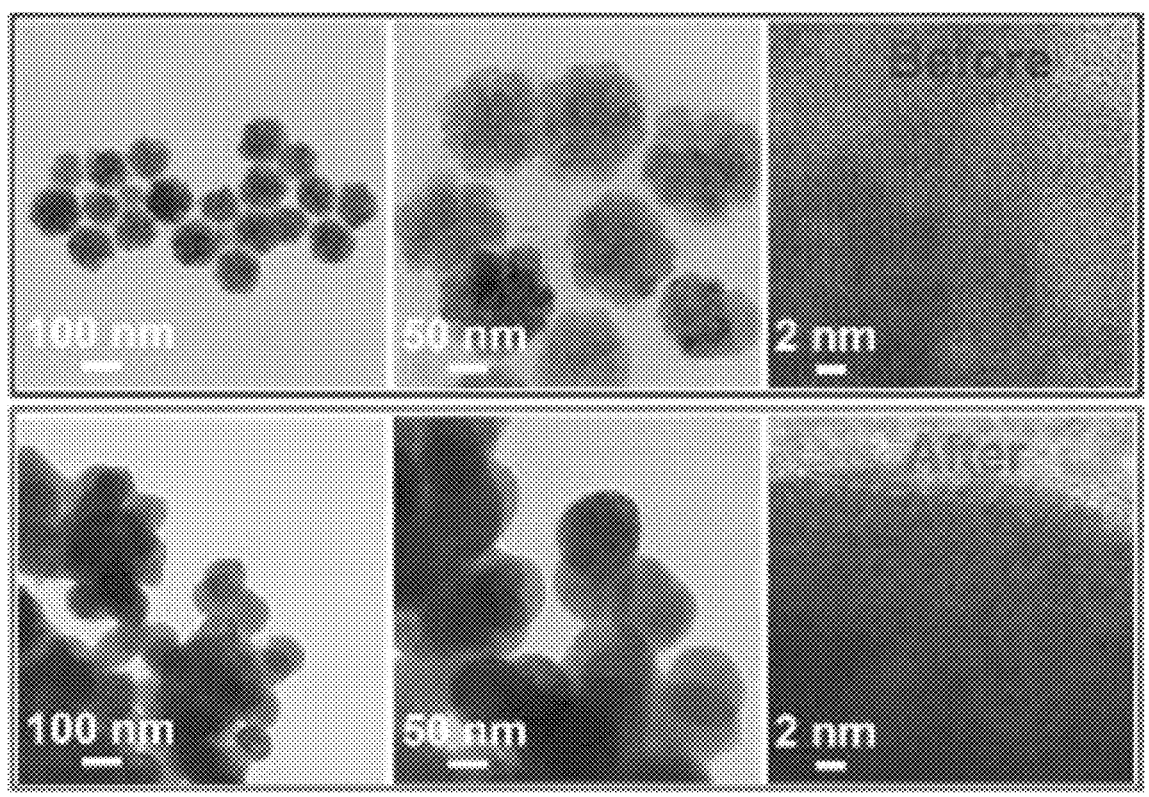
FIG. 9 is a TEM image illustrating a phase change from magnetite to Wustite, obtained by irradiation of a multiphoton pulse laser according to an example embodiment of the present disclosure.

FIG. 9 is a TEM image illustrating a phase change from magnetite to Wustite, obtained by irradiation of a multiphoton pulse laser according to an example embodiment of the present disclosure.

Referring to FIGS. 8 and 9, magnetite nanoparticles exhibit a multi-granule structure and a polycrystalline structure before irradiation of a multiphoton pulse laser. However, such a characteristic disappear after irradiation of the multiphoton pulse laser.

In XRD data, peak intensity (200) increases after irradiation of the multiphoton pulse laser. On the other hand, peak intensity (311) decreases after irradiation of the multiphoton pulse laser. Such a characteristic change denotes a phase change from magnetite to Wustite.

Figure 10:
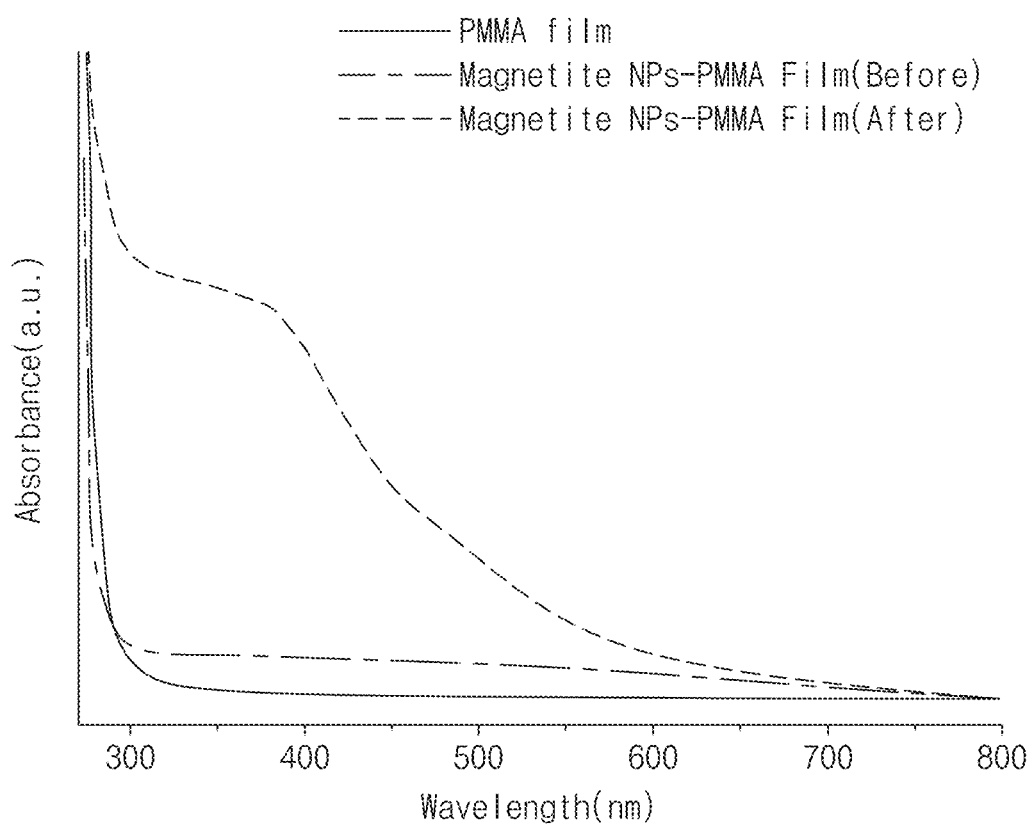
FIG. 10 shows a result illustrating an absorption spectrum of a magnetite nanocomposite according to an example embodiment of the present disclosure.

FIG. 10 shows a result illustrating an absorption spectrum of a magnetite nanocomposite according to an example embodiment of the present disclosure.

Referring to FIG. 10, a measurement result of an absorption spectrum in ultraviolet-visible regions is shown. A nanoparticle composite film after the multiphoton laser irradiation exhibits different characteristics from a wavelength of 300 nm or more, unlike a pure PMMA film and the nanoparticle composite film before irradiation of the multiphoton laser. From this, it is interpreted that a new material having a band gap different from an energy band gap of PMMA and iron oxide, which are composite components, is generated by the irradiation of multiphoton laser.

A wavelength-dependent absorption spectrum of the nanoparticle composite is shown with respect to a visible ray region from an ultraviolet region. After the irradiation of multiphoton pulse laser, the nanoparticle composite rapidly decreases in absorbance in a 300 nm region and is maintained at a constant absorbance up to a 400 nm region. Accordingly, a high-absorbance wavelength band may be selected as a wavelength band of an excitation light source for fluorescence. As a result, the wavelength band of the excitation light source is preferably 300 nm to 400 nm. The absorbance rapidly decreases at a wavelength of 400 nm or more.

Figure 11:
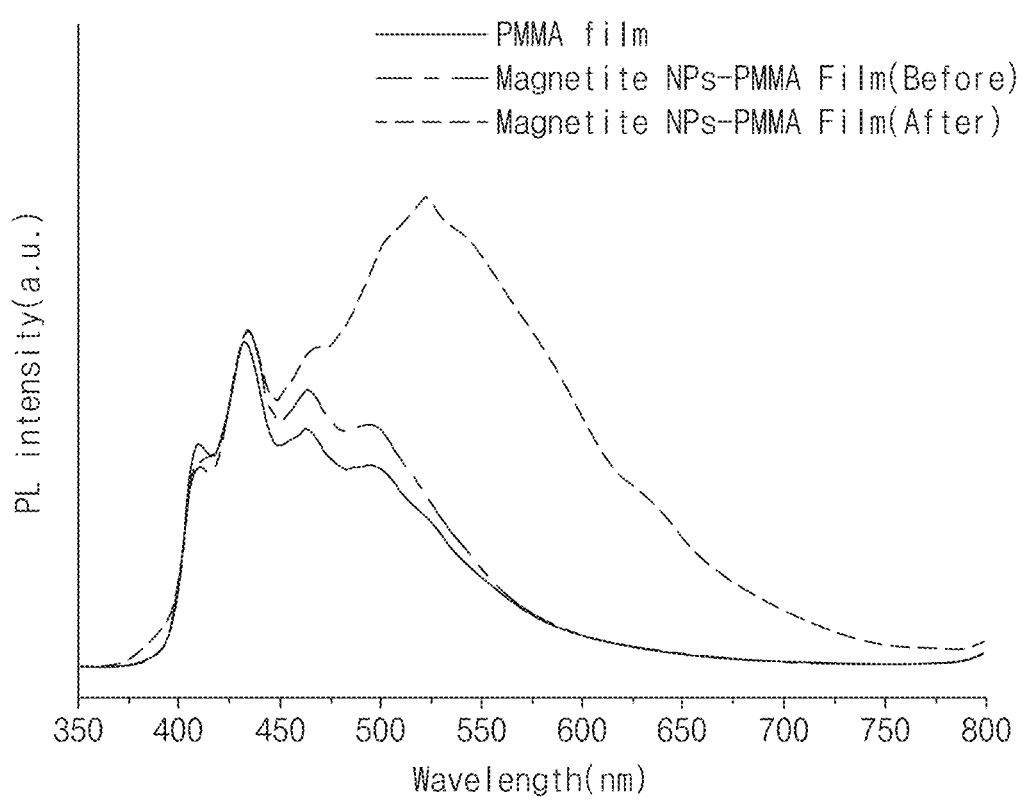
FIG. 11 shows a result of a photoluminescence spectrum of a magnetite nanocomposite according to an example embodiment of the present disclosure.

FIG. 11 shows a result of a photoluminescence spectrum of a magnetite nanocomposite according to an example embodiment of the present disclosure.

Referring to FIG. 11, a photoluminescence measurement result is shown. A He-Cd laser of 325 nm was used as an excitation light source. Fluorescence characteristics from 360 nm to 800 nm were investigated.

In the case of the PMMA film and the composite film before the irradiation of multiphoton laser, fluorescence characteristics are nearly identical to each other. A sample including only a PMMA film also exhibited fluorescence characteristics. A fluorescence peak wavelength is 420 nm, and it is difficult to use a PMMA film as a white light source.

Even when the nanoparticle composite was not irradiated by a multiphoton pulse laser, a fluorescence spectrum was measured. However, a peak wavelength is 420 nm, and it is difficult to use a PMMA film as a white light source.

A composite film changed after the irradiation of multiphoton laser exhibits a fluorescence characteristic of maximum peak at 520 nm. On the other hand, when the nanoparticle composite was irradiated by a multiphoton pulse laser, a fluorescence spectrum was measured. A peak wavelength is 520 nm, and the fluorescence spectrum has a wide spectrum distribution from blue to red. Accordingly, a magnetite nanoparticle PMMA composite film may be used as a white light source.

Figure 12:
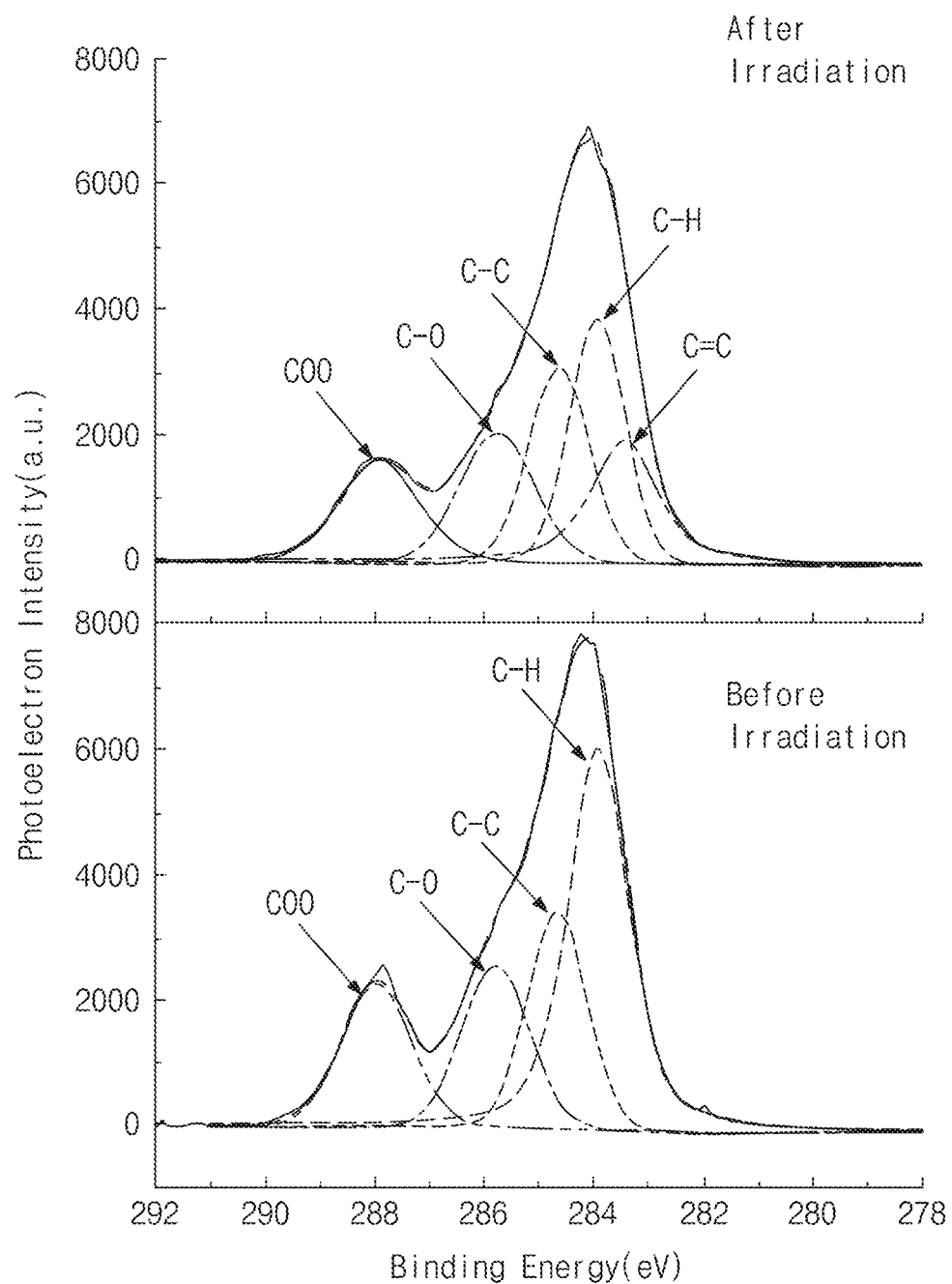
FIG. 12 shows an XPS measurement result of a nanoparticle composite according to an example embodiment of the present disclosure.

FIG. 12 shows an XPS measurement result of a nanoparticle composite according to an example embodiment of the present disclosure.

Referring to FIG. 12, a change in a bonding structure after irradiation of multiphoton pulse laser was confirmed. A carbon double bonds, known as the characteristic of a conjugated polymer, was increased. White fluorescence is interpreted as an effect of the carbon double bond.

Figure 13:
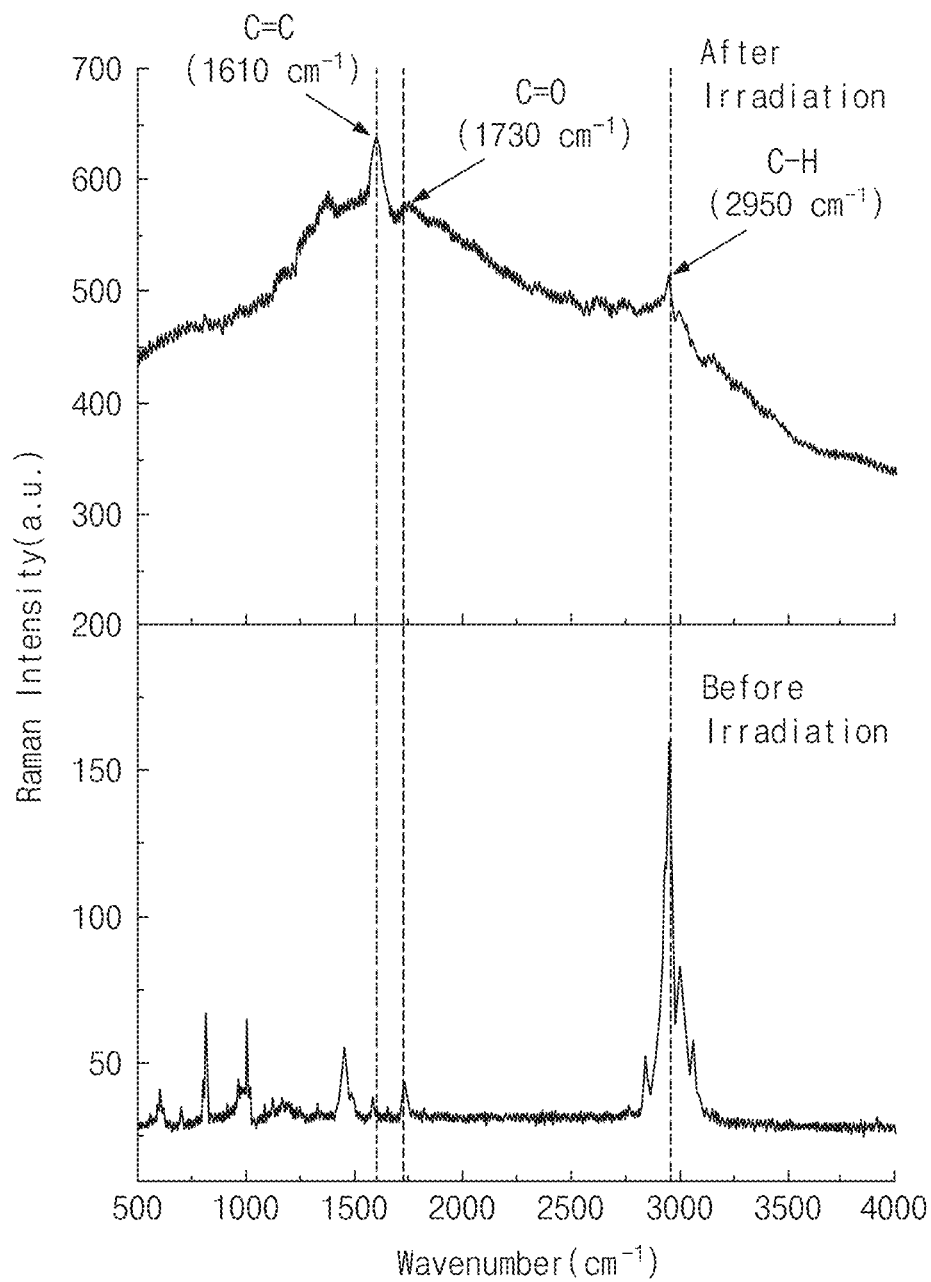
FIG. 13 shows a Raman measurement result of a nanoparticle composite according to an example embodiment of the present disclosure.

FIG. 13 shows a Raman measurement result of a nanoparticle composite according to an example embodiment of the present disclosure.

Referring to FIG. 13, increase and decrease of a bonding structure changed after irradiation of multiphoton pulse laser appear. A signals of a carbon double bond, known as the characteristic of a conjugated polymer, increases. A Raman signal near 1610 $cm^{-1}$ is due to carbon $sp^2$ bonding and is significantly increased after the irradiation of pulse laser. In a π-conjugated polymer, rearrangement of a polyacetylene-like backbone chain facilitates formation of a π-π bonding structure. In the polymer, conjugated chemical bonding provides white fluorescence under UV excitation light.

According to an example embodiment, a nanoparticle polymer composite may be prepared by forming a composite of a magnetite nanoparticle and a polymer and irradiating a high-power pulse laser to change a chain structure of the polymer.

According to an example embodiment, a nanoparticle polymer fluorescence composite may be allowed to provide white fluorescence characteristics by ultraviolet or blue excitation light.

According to an example embodiment, a fluorescent nanoparticle polymer composite film may be allowed to provide fluorescence characteristics only in a region in which nanoparticle or polymer characteristics are changed by a pulse laser.

According to an example embodiment, the cost of manufacturing a surface light source is expected to decrease due to composite characteristics using a point light source as an excitation light source, based on a fluorescence phenomenon, rather than a diffuse light of a point light source.

According to an example embodiment, a fluorescent nanoparticle polymer fluorescence composite may be allowed to control fluorescence characteristics by power of pulse laser or concentration of nanoparticles.

Although the present disclosure and its advantages have been described in detail, it should be understood that various changes, substitutions and alterations can be made herein without departing from the spirit and scope of the disclosure as defined by the following claims.

What is claimed is:

1. A method of preparing a nanoparticle-polymer fluorescent composite, the method comprising:
   preparing magnetite ($Fe_3O_4$) nanoparticles;
   mixing the magnetite ($Fe_3O_4$) nanoparticles, an organic polymer having an aliphatic carbon chain, and a solvent for dissolving the organic polymer to prepare a preliminary composite and drying the preliminary composite to form a nanoparticle polymer composite; and
   irradiating a pulse laser to the nanoparticle polymer composite to change the magnetite ($Fe_3O_4$) nanoparticles to Wustite nanoparticles and providing conjugated polymer characteristics to the organic polymer.

2. The method as set forth in claim 1, wherein:
   the pulse laser is a pulse laser having a wavelength of 690 nanometers to 1040 nanometers.

3. The method as set forth in claim 1, wherein:
   the magnetite ($Fe_3O_4$) nanoparticles are prepared by a polyol method, and
   the magnetite ($Fe_3O_4$) nanoparticles each have a diameter of 30 nanometers to 200 nanometers.

4. The method as set forth in claim 1, wherein:
   the irradiating a pulse laser is performed using a multiphoton confocal microscope.

5. The method as set forth in claim 1, wherein:
   the organic polymer includes at least one of poly(methyl methacrylate) (PMMA), polyvinylpyrrolidone (PVP), and polyvinyl chloride (PVC).

6. The method as set forth in claim 5, wherein:
   in the nanoparticle polymer composite, the PMMA to the magnetite ($Fe_3O_4$) nanoparticles is 1:0.0002 to 1:0.02 based on weight.

7. A nanoparticle-polymer fluorescent composite comprising:
   an organic polymer including Wustite nanoparticles and an aliphatic carbon chain, wherein:
   the Wustite nanoparticles were phase-changed using a photothermal reaction from magnetite ($Fe_3O_4$) nanoparticles by a pulse laser, and
   the organic polymer has a backbone chain of conjugated polymer characteristics provided by the pulse laser.

8. The nanoparticle-polymer fluorescent composite as set forth in claim 7, wherein:
   the magnetite ($Fe_3O_4$) nanoparticles each have a diameter of 30 nanometers to 200 nanometers, and
   the organic polymer includes at least one of poly(methyl methacrylate) (PMMA), polyvinylpyrrolidone (PVP), and polyvinyl chloride (PVC).

* * * * *